US007020267B2

(12) United States Patent
Kryvossidis et al.

(10) Patent No.: US 7,020,267 B2
(45) Date of Patent: Mar. 28, 2006

(54) GEOGRAPHICAL NUMBER PORTABILITY

(75) Inventors: Nikos Kryvossidis, Baydon (GB); Jeroen Langeberg, Hilversum (NL)

(73) Assignee: Lucent Technologies Inc., Murray Hill, NJ (US)

( * ) Notice: Subject to any disclaimer, the term of this patent is extended or adjusted under 35 U.S.C. 154(b) by 204 days.

(21) Appl. No.: 10/134,844

(22) Filed: Apr. 29, 2002

(65) Prior Publication Data

US 2002/0176563 A1 Nov. 28, 2002

(30) Foreign Application Priority Data

May 25, 2001 (EP) .................................. 01304649

(51) Int. Cl.
*H04M 7/00* (2006.01)
(52) U.S. Cl. ............................. 379/221.13; 379/221.14; 379/142.1
(58) Field of Classification Search ........... 379/221.14, 379/142.1, 88.21, 93.23, 142.06, 201.01, 379/201.02, 218.01, 142.17, 221.13
See application file for complete search history.

(56) References Cited

U.S. PATENT DOCUMENTS

| | | | |
|---|---|---|---|
| 5,506,894 A * | 4/1996 | Billings et al. ........ | 379/127.01 |
| 5,771,283 A * | 6/1998 | Chang et al. .......... | 379/142.01 |
| 5,970,131 A | 10/1999 | Sonnenberg | |
| 6,002,757 A | 12/1999 | Williams | |
| 6,038,443 A * | 3/2000 | Luneau ........................ | 455/415 |
| 6,097,801 A | 8/2000 | Williams | |
| 6,185,426 B1 * | 2/2001 | Alperovich et al. ...... | 455/456.1 |
| 6,353,664 B1 * | 3/2002 | Cannon et al. .......... | 379/142.1 |
| 6,445,785 B1 * | 9/2002 | Chan et al. ............. | 379/221.13 |
| 6,608,892 B1 * | 8/2003 | Shaffer et al. .......... | 379/207.12 |
| 6,678,356 B1 * | 1/2004 | Stumer et al. ................. | 379/37 |
| 2001/0016039 A1 * | 8/2001 | Slutsman et al. ....... | 379/221.13 |
| 2003/0156699 A1 * | 8/2003 | Baldwin ................. | 379/207.02 |

FOREIGN PATENT DOCUMENTS

WO WO 00/51359 8/2001

* cited by examiner

*Primary Examiner*—Ahmad F. Matar
*Assistant Examiner*—Rasha S. Al-Aubaidi

(57) ABSTRACT

Telecommunication system, with a communication network (1), and a database (10), accessible through the network (1), the database (10) comprising telephone numbers (60), and associated with a telephone number a location identification (70), each location identification (70) comprising a primary geographical location identifier (71) and a secondary geographical location identifier (72), wherein the primary geographical location identifier (71) is an identifier of an area (I–VI) of the network (1), such as a postal code, and the secondary geographical location identifier (72) is an identifier of the geographical location associated with the corresponding telephone number (60), such as a geographical place name.

5 Claims, 1 Drawing Sheet

GEOGRAPHICAL NUMBER PORTABILITY

CROSS REFERENCE TO RELATED APPLICATION

This application claims priority of European Application No. 01304649.5 filed on May 25, 2001.

BACKGROUND OF THE INVENTION

1. Field of the Invention

The invention relates to a telecommunication system with a communication network, as well as to a method for establishing a connection between a calling party and a called party over a telecommunication network.

2. Description of the Related Art

In a telephone network, a fixed telephone number is perceived by both users and routing equipment as an identity of the geographical location of the calling or the called party. In particular the area code is used by the routers in the telephone network to establish a connection over the network.

Geographical Number Portability is a service in which a subscriber can maintain his fixed telephone number, including the area code part, when the subscriber moves to a different geographical location outside the area covered by the area code. This service, together with other services that require the portability of a telephone number over different geographical locations, is highly desirable. However, several problems arise when implementing such service. The routing of a call will not be possible based on the perceived area code of a telephone number, as this no longer necessarily corresponds with the actual geographical location. Furthermore, a number displayed as the Calling Line Identity, will no longer necessarily indicate the geographical location, thus creating confusion for the subscriber being called.

SUMMARY OF THE INVENTION

It is therefore an object of the invention to provide a telephone system with which fixed numbers are portable over a geographical area and the geographical location of a fixed number is maintained.

To meet this objective the invention proposes a system according to claim 1.

The telecommunications network system according to the invention is provided with a database including data fields with records with telephone numbers and for each telephone number a location identifier. The location identifier is comprised of a first geographical location identifier and a second geographical location identifier. The first identifier relates to the geographical area of the fixed telephone number, for example an area or postal code, whereas the second identifier relates to a location name, for use as display information at the called party end. In use, network elements, such as switches, retrieve the location identifier for the telephone number, and use the primary geographical location identifier for routing purposes, and include the second geographical location identifier for use as a display parameter. This ensures that telephone numbers can be ported over different geographical areas, while maintaining routing functionality and caller identification.

BRIEF DESCRIPTION OF THE DRAWINGS

Particularly advantageous elaborations of the invention are set forth in the dependent claims. Further objects, elaborations, modifications, effects and details of the invention appear from the following description, in which reference is made to the drawings, in which

DETAILED DESCRIPTION

Figure 1:
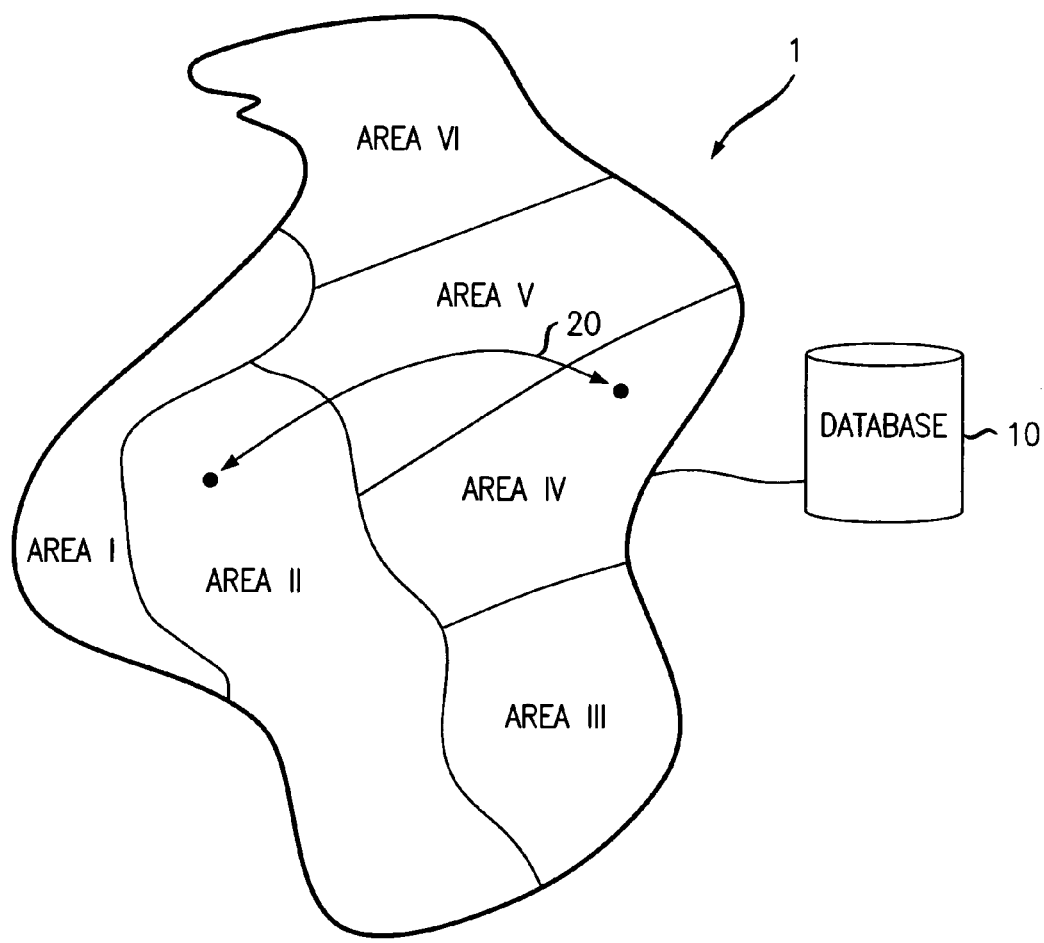
FIG. 1 shows schematically an geographical area map.
Figure 2:
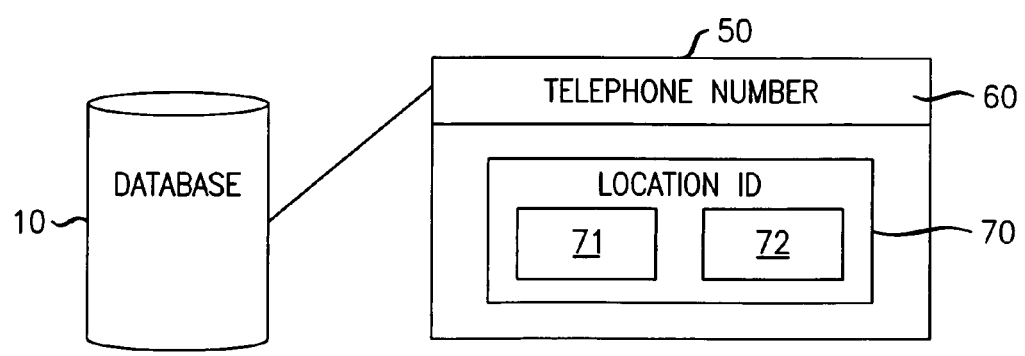
FIG. 2 shows schematically a database and a database record.

In FIG. 1 a map of a geographical region is shown, which region is divided into different areas, indicated respectively with Roman numerals I–VI.

In the following example of an embodiment of the invention, a geographical area 1 is provided with a telecommunication network covering all areas I–VI making up the area 1. The network comprises fixed telephone connections for users of the network, and optionally other connections such as for example mobile connections. The network can be implemented in any suitable and known fashion, for example as a public switched telephone network.

In a public switched telephone network (PSTN) subscribers are connected to the PSTN by means of fixed telephone connections to the local point of presence (POP) of the network. The switches in the PSTN are organised in a hierarchy, wherein a low level in the hierarchy is characterised by fixed connections in one particular geographical area. The identification of such a fixed connection by means of the telephone number comprises an area code which corresponds with the geographical area covered by the network.

When routing a call through the network, use is made of the area code as switching information to establish a connection 20 between the party calling and the party called.

In the present invention, the network is provided with a database 10 containing data entries 50 each comprising a telephone number 60, and associated with the telephone number a location identification 70. The location identification comprising a primary geographical location identifier 71 and a secondary geographical location identifier 72.

The primary geographical location identifier 71 is an identifier of an area of the network, and in particular the geographical location of the fixed telephone number within the network. For example the primary geographical location identifier 71 could be implemented as a postal code or an area code.

The secondary geographical location identifier 72 is an identifier of the geographical location associated with the corresponding telephone number, for use as display information for the party called. For example the secondary geographical location identifier can be implemented as a geographical place name where the fixed connection is located.

The database is accesible through the network, and can be for example be implemented on a computer system connected to the network. The database can be implemented in a physical entity or as a logical entity; in the latter case data is stored throughout the network. Methods of storing a database as a logical entity are per se known in the art.

In use, a connection is established between a calling party A and a called party B as follows. First, the network establishes contact with the database 10 to retrieve from the database the location identification 70 corresponding with the telephone number of party B. Consecutively, the call is routed through the network, using as routing information for the switches in the network the location identification 70, and in particular the primary geographical location identifier 71, and a a connection is established. The secondary geographical location identifier 72 is also carried through the network, and the identifier 72 is delivered to party B, where it can be used, for example by displaying it on the telephone set. The identifier 72 gives the called party B information about the geographical location of the calling party A.

What is claimed is:

1. A telecommunications system comprising a communication network and a database accessible through said network, said database storing for each subscriber a fixed telephone number including a first area code, and associated with each fixed telephone number including a first area code a location identification, the location identification comprising a second area code used in routing a call to which the subscriber is a party, the second area code indicating the area to which the subscriber has moved; the location identification also comprising a geographical location identifier used for display used for display to a called terminal upon establishment of a call from the subscriber to the called terminal, wherein said geographical location identifier for display is an identifier of a fixed geographical location permanently associated with the fixed telephone number of the subscriber, said fixed telephone number including said first area code.

2. System according to claim 1, wherein said geographical location identifier for display comprises a geographical place name.

3. System according to claim 1, wherein said database comprises all telephone numbers accessible through said communication network.

4. A method of establishing a call connection between a calling subscriber terminal and a called subscriber terminal over a telecommunication network, wherein said calling subscriber terminal is identified by a fixed calling telephone number including a first area code, the calling subscriber terminal having moved to an area outside that indicated by the first area code, and said called subscriber terminal is identified by a called telephone number, said method comprising the steps of:

retrieving from a database, location identification associated with said calling telephone number; and establishing the call connection based on said retrieved location identification, the location identification comprising a second area code used to route the call connection between the calling subscriber terminal and the called subscriber terminal, the second area code indicating the area to which the calling subscriber terminal has moved; and the location identification also comprising a geographical location identifier for display to the called subscriber terminal upon the call connection being established, the geographical location identifier for display being an identifier of a fixed geographical location permanently associated with the calling telephone number including the first area code.

5. Method according to claim 4, wherein said secondary geographical location identifier comprises a geographical place name.

* * * * *